United States Patent [19]

Williams et al.

[11] Patent Number: 4,816,668

[45] Date of Patent: Mar. 28, 1989

[54] MOLD NUMBER READER WITH FIELD OPTICS PHOTODETECTOR

[75] Inventors: Reade Williams, New London, N.H.; Paul F. Scott, Hartford, Conn.

[73] Assignee: Emhart Industries, Inc., Farmington, Conn.

[21] Appl. No.: 131,148

[22] Filed: Dec. 10, 1987

Related U.S. Application Data

[63] Continuation-in-part of Ser. No. 65,650, Jun. 23, 1987, Pat. No. 4,713,536, which is a continuation of Ser. No. 814,853, Dec. 30, 1985, abandoned.

[51] Int. Cl.[4] .......................... G01N 9/04; G06K 7/10

[52] U.S. Cl. ................................ 250/223 B; 250/556; 235/464

[58] Field of Search ............................ 250/223 B, 566; 209/524, 525; 235/454, 462, 464, 494; 356/239, 240

[56] References Cited

U.S. PATENT DOCUMENTS 4,175,236 11/1979 Juvinall .......................... 250/223 B
4,201,338 5/1980 Keller ............................ 250/223 B
4,230,266 10/1980 Juvinall .......................... 250/223 B
4,713,536 12/1987 Williams et al. ................ 250/223 B

*Primary Examiner*—David C. Nelms
*Assistant Examiner*—Stephone B. Allen
*Attorney, Agent, or Firm*—Spencer T. Smith

[57] ABSTRACT

A mold number reader for detecting code marks at the heel of a transparent bottle or the like, such code marks desirable being in the form of dots or balls protruding from the bottle's heel. During rotation of the bottle, its heel portion is illuminated with a structured light source in the form of a narrow rectangle, which light is selectively reflected by code marks and collected by field-type optics. The use of a well defined light source of small area provides a high input signal level, while the field optics enjoys a high depth of field and hence decreased sensitivity to bottle placement during inspection. The light source may be a modulated laser diode and the signal processing electronics may include a demodulator to process the photodetector output signal. The use of heterodyned signal processing decreases the sensitivity to ambient light and other sources of noise in the output signal.

17 Claims, 5 Drawing Sheets

MOLD NUMBER READER WITH FIELD OPTICS PHOTODETECTOR

BACKGROUND OF THE INVENTION

The present invention relates to the identification of a mold with a glass container or like molded article, and more particularly to the design of reliable inspection apparatus, suited to detecting "dot codes".

In the manufacture of glass containers and like articles in a press mold, casting mold, or blow mold, any malformations of the mold are transferred onto the article. It is necessary in such applications to identify the mold in which a specific defective article has been produced and sort out all articles made in this mold. This need has been particularly acute in the high speed production of glass containers, in which the molds are subjected to destructive thermal and mechanical influences. The generally accepted approach to this problem has been to furnish each mold with a marking, to be transferred onto all articles molded thereby.

A variety of mold identification code markings have been adopted, among the most popular of which is the dot-code; the present invention is especially applicable to the accurate detection of this type of code. Typical of the prior approaches to mold number reading is the system of commonly assigned U.S. Pat. No. 4,201,338. In the '338 system and similar prior art mold number readers, a light source illuminates an area of the bottle's heel large enough to account for variations of bottle shape, relative placement of the photodetector, and other geometric factors. Light which has been reflected from a dot-code marking on the bottle is focused into the photodetector using a imaging-type optical system, and processed to extract the mold identification information. Such systems do not clearly discriminate between background light and the light produced by the code marking, and require elaborate filtering to minimize this problem. More significantly, such systems have a quite limited depth of field, and hence are very sensitive to variations in bottle motion and other disturbances.

Accordingly, it is a principal object of the invention to provide improved method and apparatus for identifying code markings on glass containers and other articles. As a related object, such apparatus should enjoy reliable performance under high speed operating conditions.

Another object is to provide a durable system which is easily adapted to a variety of operating environments.

A further object is to achieve a high degree of accuracy in the face of possible sources of "noise" in the output signals of such apparatus. These devices should enjoy increased immunity to background light and other spurious signal sources.

SUMMARY OF THE INVENTION

The above and additional objects are successfully realized by the mold identification apparatus and method of the invention, in which the pattern of protruding mold code marks arranged along a scanning line at an outer surface of a molded container is detected using a field optics assembly. The article sector containing an array of protruding mold code marks is illuminated with a substantially collimated light beam of limited cross section. This light beam creates a well defined area of illumination of high luminance at the scanning line, which illumination is selectively reflected. The light beam has a cross-section approximately equal to or less than the spacing between code marks to avoid illuminating more than one code mark at a time, and a dimension transverse to the scanning line substantially greater than the corresponding dimension of the code marks to accommodate misalignment. In the absence of a mold code mark, the light is reflected away from the field optics assembly, while a mold code mark if present reflects a detectable portion of the light to the field optics assembly. Thus, a detectable light input to the field optics assembly provides a reliable indication that a code mark is present.

In the preferred embodiment of the invention, the mold code marks are essentially hemispherical "dot codes" arranged along a sector at the heel of the container. Preferably, in such embodiment the codes are read while rotating the container. Alternatively, the code marks may be located at the bottom of the container. In the bottom code reading embodiment, especially for round containers, the codes may be arranged in a circle rotating the container as in the preferred embodiment. Alternatively, for non-round containers, the codes may be read while maintaining the container in a fixed orientation; in this approach, the codes are arrayed along the bottom of the container along an axis correlated with the container's shape and natural orientation.

One aspect of the invention is the nature of the code mark illumination. Most preferably, for detecting dot codes, the area of illumination is a narrow rectangle of substantially greater vertical dimension than the code mark diameter, but somewhat narrower than such diameter. Thus, when scanning a vessel for dot codes, the illumination will at any given time be distinctly associated with at most a single code mark, as the direction of scanning is transverse to the long axis of the illuminated area. Due to the high luminance of such illumination, a clearly detectable signal will arise in the presence of a code mark.

Another aspect of the invention is the nature of the field optics assembly. This assembly captures light within a "zone of acceptance", which in the preferred embodiment is conical. Advantageously, this assembly includes an objective lens which defines the zone of acceptance, and a field lens which focuses light onto a photodetector. The photodetector provides a light energy signal representative of the amount of light collected by the field optics assembly. The variations over time of the photodetector output signal while scanning the mold code sector provides a reliable indication of the code mark pattern.

In the preferred embodiment of the invention, the light source provides a light energy output modulated at a high frequency, and the photodetector output is demodulated to extract the signal at the modulation frequency. This heterodyned signal technique reduces the output signal noise due to background light and other sources.

BRIEF DESCRIPTION OF THE DRAWINGS

The above and additional aspects of the invention are illustrated in the following detailed description of the preferred embodiment, which is to be taken together with the drawings in which.

DETAILED DESCRIPTION

Figure 1:
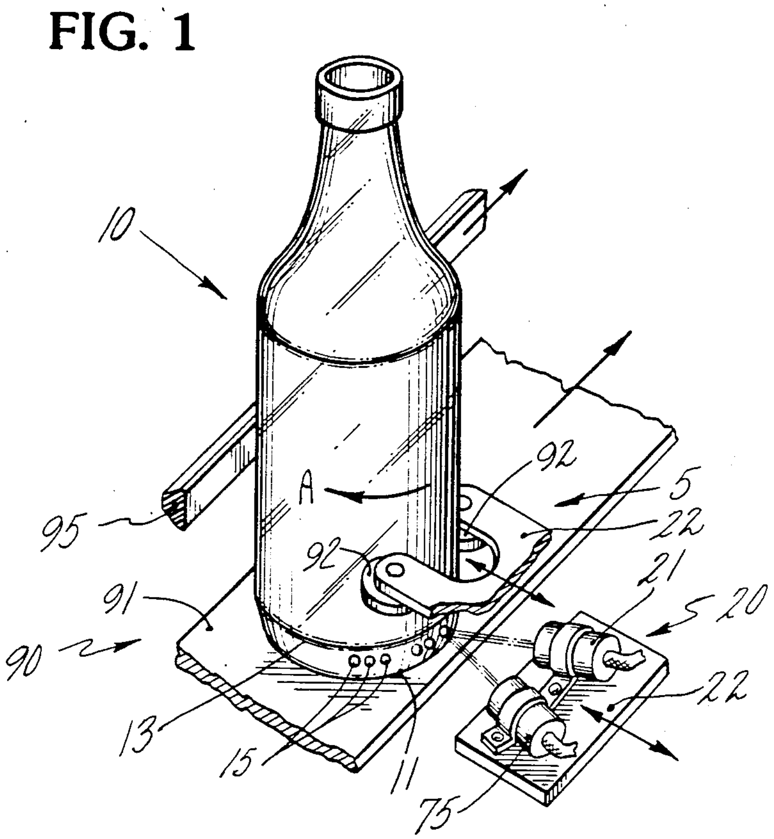
FIG. 1 is a fragmentary perspective view of mold identification apparatus in accordance with preferred embodiment of the invention.

Reference should now be had to FIGS. 1-6 for a detailed description of a preferred mold identification device embodying the invention. FIG. 1 gives a fragmentary perspective view of a mold identification system 5, including bottle handling apparatus 90 and code reader assembly 20. The bottle handling apparatus 90 is designed to stop a glass container 10 at the inspection station and rotate it to present to the code reader system 20 an array of code markings 15 near the container's heel. Illustratively, the bottle handling devices 90 include underlying conveyor 91 as well as side belt 95 and spring loaded rollers 92. When container 10 has arrived at the inspection station, rollers 93 press the container against side belt 95 for rotation through at least one container circumference. In the illustrated embodiment, the code reader assembly 20 includes a movable base 22 carrying a light source assembly 21 and photodetector assembly 75. Base 22 moves in conjunction with rollers 92 toward container 10 to bring assemblies 21 and 75 into a suitable position for inspection, as further discussed below.

Figure 6:
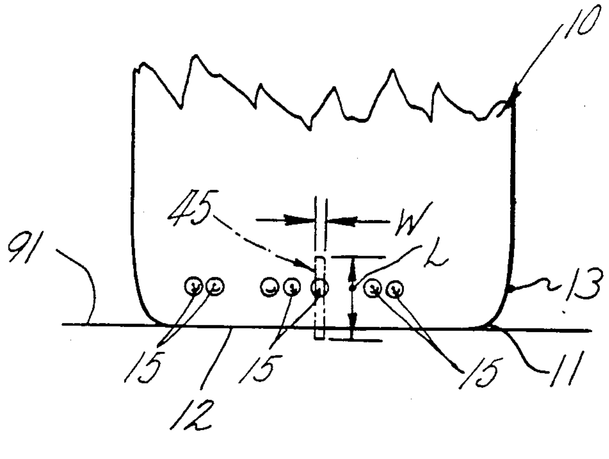
FIG. 6 is a partial elevation view of a container undergoing inspection by the apparatus of FIG. 1.

As may best be seen in the elevation view of FIG. 6, container 10 includes a circumferential array of code marks 15 located in a sector 13 just above the bottle's heel 11. Each of code marks 15 illustratively comprises an essentially hemispherical protrusion from the container's side wall. In the present invention, the light source assembly 21 provides a small, well defined illuminated area 45. Preferably, the illuminated area 45 takes the form of a narrow rectangle with its long sides of length L essentially parallel to the axis of symmetry of container 10 (i.e., vertical axis), such illuminated area extending well above and below the height of code marks 15. The width W of illuminated zone 40 is advantageously somewhat narrower than the diameter of code markings 15. It will be seen that the area of illumination is quite limited in comparison with those of typical prior art "imaging-type" mold identification systems. The illumination of code markings 45 with a narrow, well-defined light pattern of high luminance, provides clear, distinct identification of each of the dot-code markings 15 of a given mold code pattern.

Figure 2:
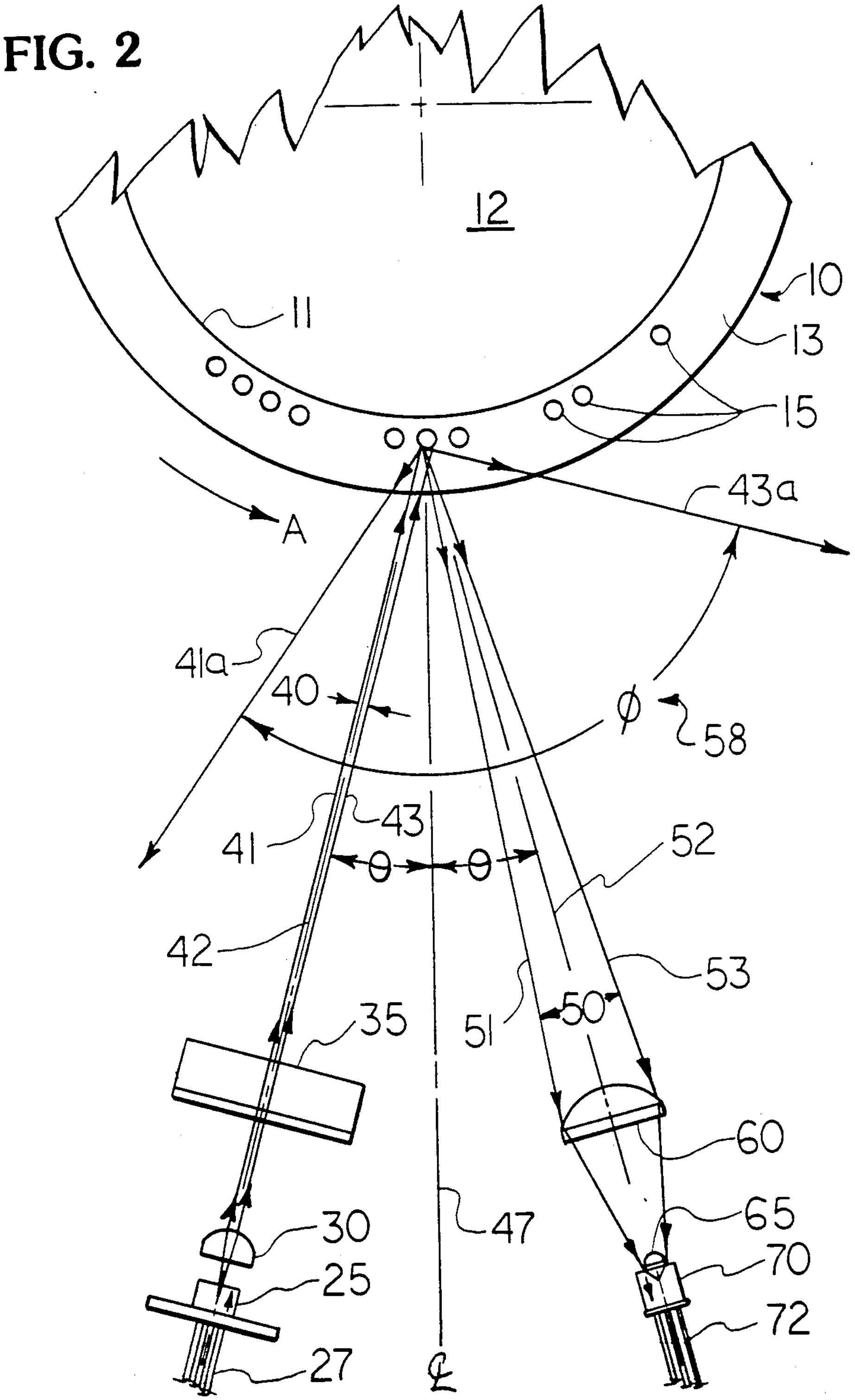
FIG. 2 is an optical schematic diagram of the mold identification apparatus of FIG. 1, viewed from below.

Having reference to the optical diagram of FIG. 2, which views the code reader optics 20 and bottle 10 from below, the light source 25 advantageously consists of a laser diode. In a given operative embodiment, light source 25 consisted of a Mitsubishi ML4102 or ML4402 laser diode, operating in fundamental transverse mode, with a limited astigmatism of around 4 micrometers (ML4102 and ML4402 are tradenames of Mitsubishi Electric Corporation). This laser diode provides essentially a point source of near-infrared light with fan-out characteristics which depend on orientation relative to the junction diode. Light emitted from laser diode 25 passes through plano-cylindrical lenses 30 and 35, which are perpendicularly oriented (compare FIGS. 2 and 3). Advantageously, lens 30 is separated from the junction of laser diode 25 by one focal length. Lenses 30 and 35 limit the divergence of light rays 41, 43 from the central axis 42 in the horizontal and vertical planes, respectively. Thus, this lens system focuses the laser light to form a collinated beam 40 of high luminance and limited cross section.

When the illuminated area 45 encompasses a given code mark 15, light will be reflected over a zone of reflection 58 of angle $\phi$ in the horizontal plane. This zone of reflection is defined by the reflected rays 41*a*, 43*a*, arising from the extreme incident rays 41, 43. Objective lens 60 subtends a fixed portion of the zone reflection—in the preferred embodiment, a conical "zone of acceptance"—over which the reflected light will be captured. The extent of this zone of acceptance determines the lateral field of view over which code markings 15 will be detected. Illustratively, lens 60 is a plano-convex spherical lens. Lens 60 converges the captured light to field lens 65, which in turn focuses the light onto photodetector 70. In an operative embodiment of the invention, photodetector 70 comprises a PIN photodiode, 508204200 series, of Hewlett Packard Corporation.

Figure 3:
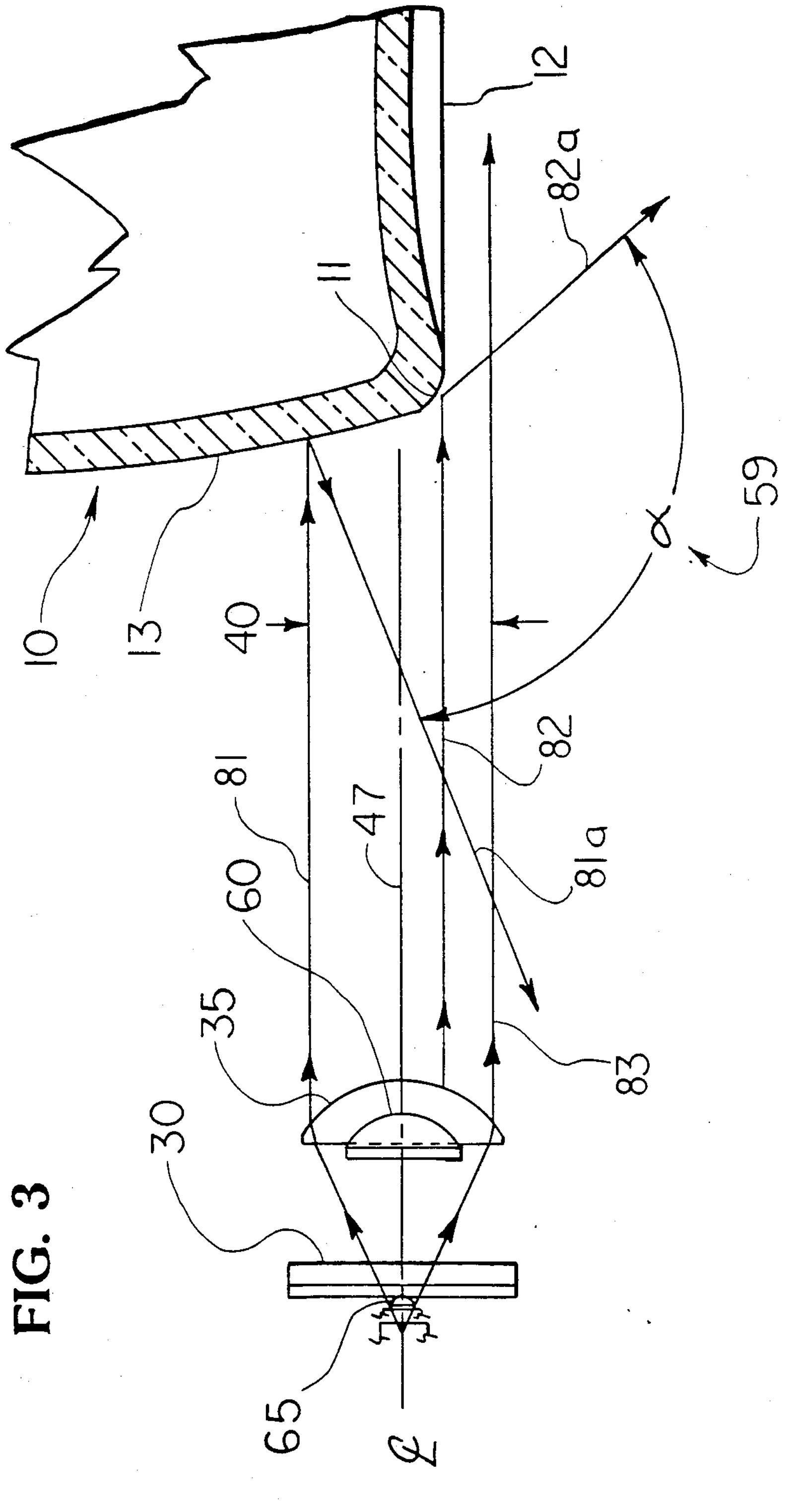
FIG. 3 is an optical schematic diagram of the apparatus of FIG. 1, viewed along an axial container section not containing a code marking.
Figure 4:
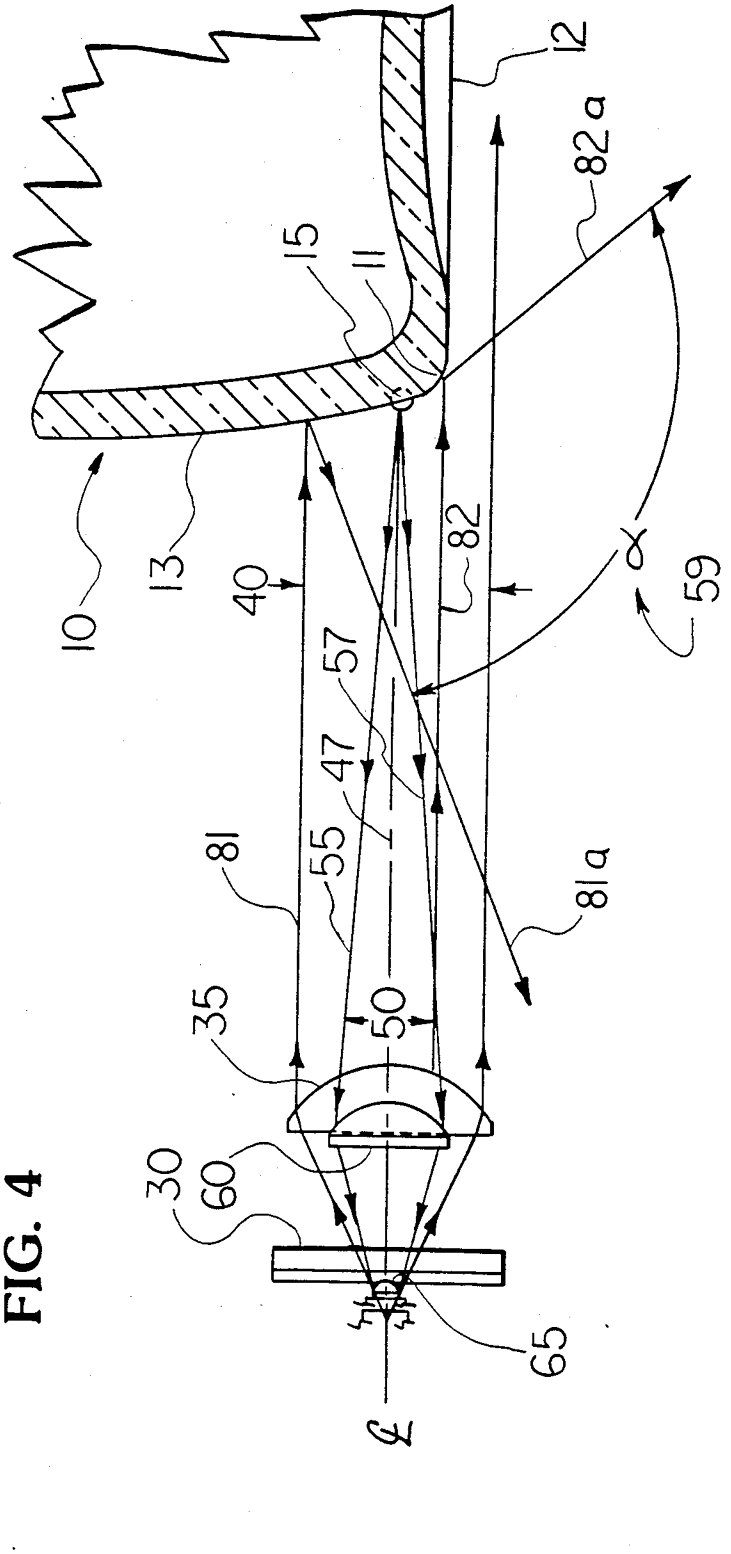
FIG. 4 is an optical schematic diagram of the apparatus of FIG. 1, viewed along an axial container section containing a code marking.

FIGS. 3 and 4, both taken along on axial plane of container 10, illustrate the difference in reflection of the incident light 40 depending on whether a code mark 55 is present or absent. In FIG. 3, with no code mark present, light will be reflected by the inclined container surface 13 generally downwardly within a zone of reflection 59 of angle $\alpha$ defined by boundaries 81*a*, 82*a*. Inasmuch as this zone of reflection 59 does not encompass the lens 60, none of this light will be captured by the field optics. As seen in FIG. 4, if a code marking 15 is present, however, a portion 50 of the light reflected by mark 15 will be directed to lens 50 and captured by the field optics assembly. In the preferred embodiment of dot-code identification, in which code marking 15 is essentially hemispherical, it will reflect the incident light over a broad, continuous zone (a "line out" pattern).

Referring again to FIG. 2, the light source assembly 21 and photodetector assembly 75 are each aligned at an angle $\theta$ relative to the center line 47. Smaller values of $\theta$ provide higher depths of field, but require more compact packaging and mounting of the components of assemblies 21, 75 (FIG. 1). It is a principal advantage of the present invention that the use of field optics in the photodetector 75 provides depths of field which are far superior to prior art, "imaging" systems.

Figure 5:
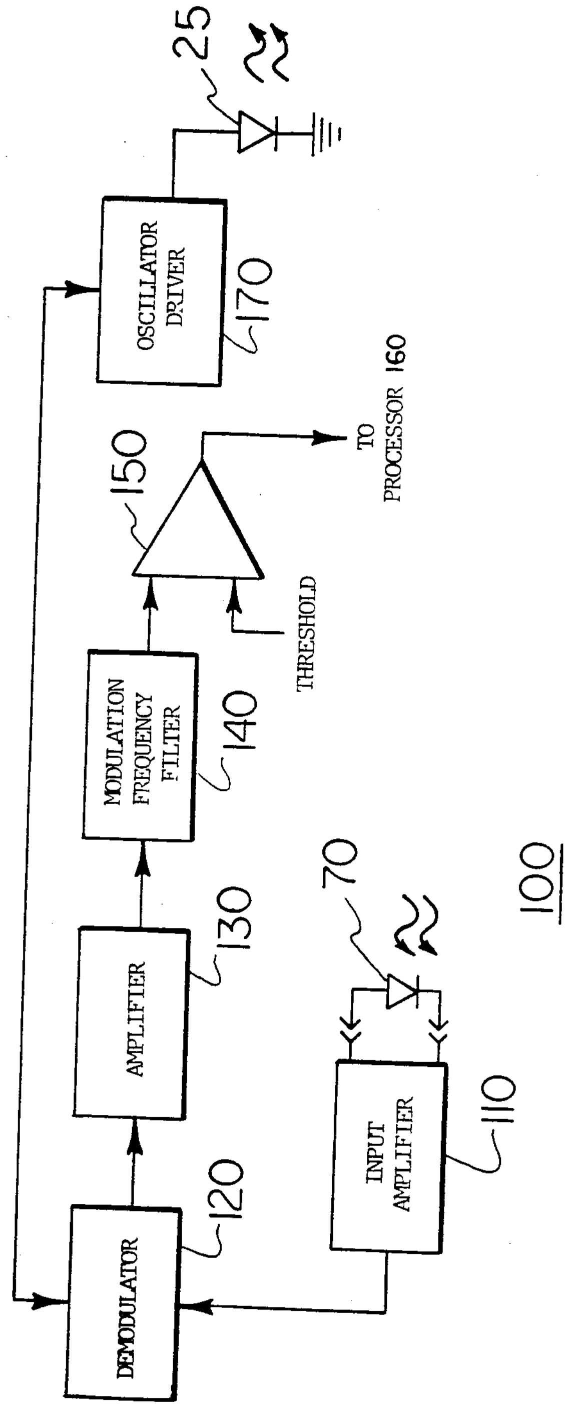
FIG. 5 is a block schematic diagram of an electronic driver-signal processing circuit for the apparatus of FIG. 1.

FIG. 5 schematically illustrates a preferred heterodyned, design of electronics 10 for driving laser diode 25 and for processing the output of photodiode 70. Laser diode 25 is driven by a square wave, current controlled oscillator driver 170. Modulating the light source 25 at a high frequency distinguishes the reflected light detected by photodiode 70 from ambient light. Thus, the photodiode output is amplified at 110, demodulated at 120, reamplified at 130, and passed through a modulation frequency filter 140 to extract the radiometric signal representing the light reflected by a code marking 15. This is compared with a preset threshold by comparator 150 to determine whether a significant signal is present, indicating a code mark 15. The comparator output is received by processor 160 to derive the identification code information. Electronics 100 produces a series of signal peaks representing the individual marks 15 of the dot-code pattern, and interprets these using a suitable decoding algorithm.

As an alternative to the use of a modulator/-demodulator system to reduce the effects of background light, the light source optics 21 may include an optical filter which is spectrally matched to the laser diode 25. This technique takes advantage of the fact that laser diode 25 emits light with a very narrow bandwidth.

Although the above disclosed preferred embodiment of applicants' mold identification apparatus and method involve the reading of raised code markings arrayed within a sector at the heel of a rotating glass container 10, it should be noted that the invention may be extended to other types of mold number readers. For example, the raised code marks may be located at the bottom of the container 10, wherein they are illuminated with a substantially collimated light beam of limited cross section, and a field optics code detector assembly scans the portion of the bottle bottom where the codes are located to detect reflections (indicative of the presence of a unique code marking). This could be done with code markings arrayed in the circle on the bottom of a round container, rotating the bottle as in the preferred embodiment. Alternatively, for non-round containers, the codes may be arrayed in a non-circular pattern correlated with the container shape (e.g. along an axis of symmetry), pre-orienting the containers in a natural orientation for code reading. Such preorientation may be effected for example using the apparatus of commonly assigned U.S. Pat. No. 4,653,628. Possibly, more than one array of raised code markings may be provided, such as raised dot codes arranged in a cross pattern.

While reference has been made above to a specific embodiment, it will be apparent to those skilled in the art that various modifications and alterations may be made thereto without departing from the spirit of the present invention. Therefore, it is intended that the scope of this invention be ascertained by reference to the following claims.

We claim:

1. A method for reading raised code marks arrayed along a scanning line at the outer surface of a container, said method comprising the steps of:

illuminating the container at the scanning line with a substantially collimated light beam of elongated cross section as exhibited on the outer surface of the container to produce reflections from the container, the light beam cross-section having a dimension along the scanning line approximately equal to or less than a spacing between the code marks so that the light beam can essentially illuminate no more than one code mark at any time, and a dimension transverse to the scanning axis substantially greater than the corresponding dimension of said code marks to accommodate misalignment;

detecting light directed at a field optics assembly including light transmitted from a portion of the surface of said container substantially broader than the area of a raised code mark, such detected light including at least part of the reflections of said collimated light beam from code marks, but relatively little of the reflections of said collimated light beam from other portions of the container; and generating code identification signals corresponding to the intensity of the light detected by said field optics assembly.

2. A method as defined in claim 1, for detecting essentially hemispherical code marks, wherein the substantially collimated light beam has an essentially rectangular cross-sectional area.

3. A method as defined in claim 1, for reading code marks arrayed along said scanning line at the bottom of the container, further comprising the step of moving the container to cause motion of the substantially collimated light beam along said scanning line.

4. A method as defined in claim 1, wherein the container comprises a substantially radially symmetric transparent container, and the code marks are located in a circumferential band near the base of the transparent container.

5. The method as defined in claim 2, where the area of illumination on the container has a height transverse to the scanning line greater than the diameter of the code marks, and a width parallel to the scanning line less than said diameter.

6. A method as defined in claim 4, wherein the circumferential band is inclined from a vertical orientation.

7. A method as defined in claim 3 for reading code marks on round containers, wherein the scanning line is essentially circular and the moving step comprises rotating the container.

8. A method as defined in claim 3, for reading code marks on non-round containers, further comprising the step of preliminarily orienting the container, wherein the moving step comprises translating the preoriented container along a linear axis correlated with a natural orientation of the container.

9. Apparatus for reading molded code marks circumferentially arranged along a scanning line at the outer surface of a container, said apparatus comprising:

means for moving the container to sequentially position said marks for reading;

means for illuminating the code marks during the movement of the container with a substantially collimated light beam of elongated cross-section, said light beam having a dimension along the scanning line less than or equal to the separation of adjacent code marks;

lens means for collecting light transmitted from an area of the surface of said container substantially broader than that of a molded code mark; and photodetector means for producing light intensity signals representative of the intensity of the light collected by said lens means;

wherein, in the absence of a code mark in the path of said collimated light beam, the container substantially reflects the light beam away from said lens means so that said photodetector means produces a light intensity signal corresponding to the absence of a code mark, and in the presence of a code mark in the path of the light beam, the code mark reflects a detectable portion of said light beam to said lens means so that said photodetector means produces a light intensity signal corresponding to the presence of said code mark.

10. Apparatus as defined in claim 9 wherein the light beam has a dimension transverse to the scanning line substantially greater than the corresponding dimension of said code marks, to accommodate misalignment.

11. Apparatus as defined in claim 9, further comprising signal processing means for processing said light intensity signals over time and producing code identification signals corresponding to said light intensity signals and representative of a code formed by said code marks.

12. Apparatus as defined in claim 9, wherein the container is substantially radially symmetric, the code marks are located in a circumferential band near the base of the container, and the moving means rotates the container around its axis of symmetry.

13. Apparatus as defined in claim 9, wherein the lens means comprises an objective lens and a field lens, said objective lens being positioned to receive light from said container and focus the light upon said field lens, and said field lens being positioned to focus the light focused upon it by said objective lens onto the photodetector means.

14. An apparatus as defined in claim 9 wherein said means for illuminating the container includes a laser and two plano-cylindrical lenses oriented perpendicularly relative to each other and placed between the laser and the container to limit the cross section of the laser beam.

15. Apparatus as defined in claim 9, for reading code marks arrayed along a scanning line at the bottom of the container.

16. Apparatus as defined in claim 15, for reading code marks arranged in a circular pattern on the bottom of substantially radially symmetric containers, wherein the moving means rotates the container around its axis of symmetry.

17. Apparatus as defined in claim 17, for reading code marks on the bottom of non-round containers, further comprising means for preliminarily orienting the container, wherein the moving means translates the container along a linear scanning axis correlated to a natural orientation of the container.

* * * * *